United States Patent Office 3,676,249
Patented July 11, 1972

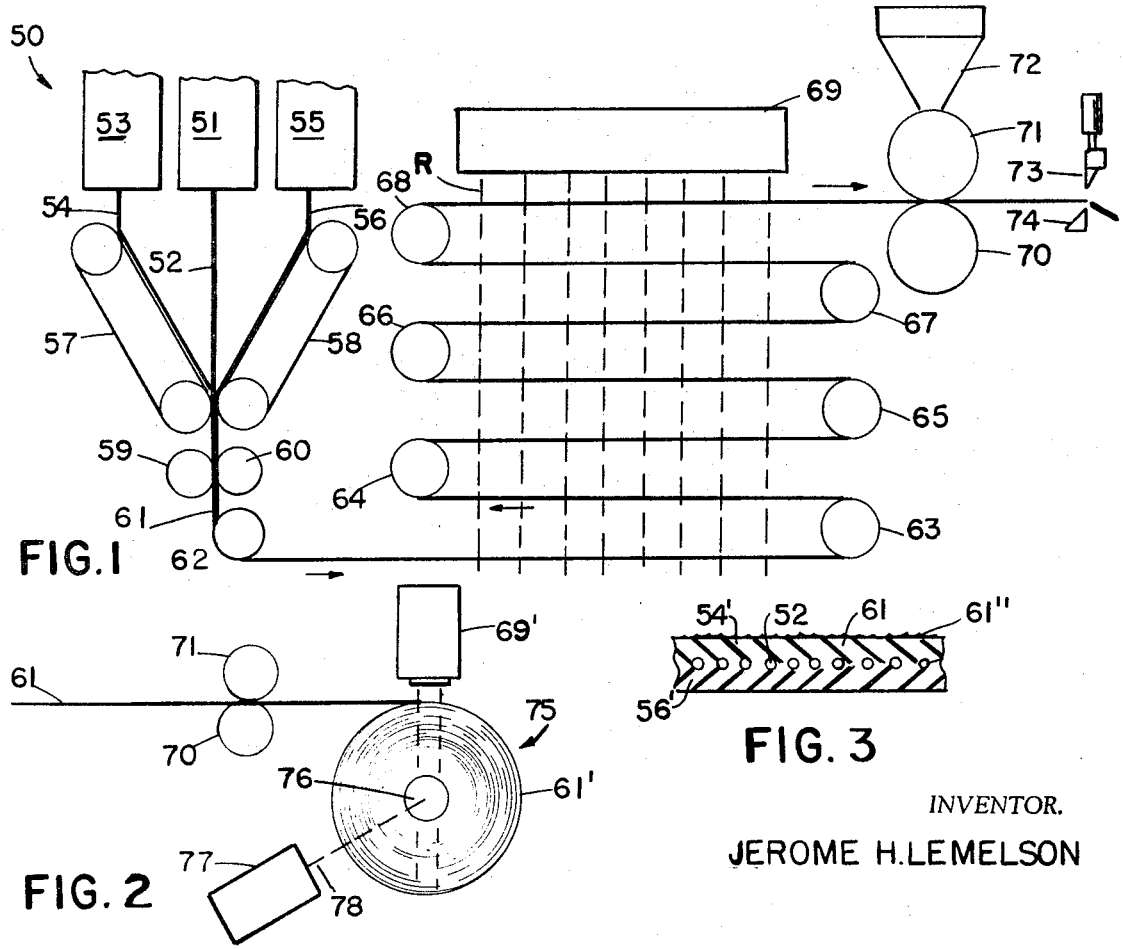

3,676,249
IRRADIATION METHOD FOR PRODUCTION OF
FIBER-REINFORCED POLYMERIC COMPOSITES
Jerome H. Lemelson, 85 Rector St.,
Metuchen, N.J. 08840
Continuation-in-part of application Ser. No. 269,832, Mar. 22, 1963, which is a continuation-in-part of application Ser. No. 651,749, Apr. 9, 1957. This application is also a continuation-in-part of application Ser. No. 501,174, Oct. 22, 1965, which is a continuation-in-part of application Ser. No. 393,292, Aug. 31, 1964, now Patent No. 3,594,254. This application Dec. 18, 1967, Ser. No. 696,966
Int. Cl. B32b 31/30, 31/28
U.S. Cl. 156—244
12 Claims

ABSTRACT OF THE DISCLOSURE

A method is provided for irradiating material on a continuous basis to improve or predeterminately change its physical and chemical characteristics. In one form, polymeric material is continuously formed by extrusion and is continuously combined with or sealed to a second material to form an integral unitary structure therewith after which said unitary structure is driven and guided in a predetermined path through a field of intense radiation which is operative to change the physical characteristics of one or more of the components of the composite material such as by effecting the cross linking of the polymer.

In another form, a material such as a polymer is continuously fed or formed into a sheet or other suitable shape and a plurality of reinforcing elements such as glass filaments are encapsulated within the polymer or otherwise secured thereto on a continuous basis. The resulting composite filament-reinforced member is thereafter treated to effect the cross linking of the polymer to improve its physical characteristics and to improve the bond between the polymer and the reinforcing filaments.

RELATED APPLICATIONS

This application is a continuation-in-part of my application Ser. No. 269,832, filed on Mar. 22, 1963, entitled Plastic Fabrication, now abandoned, which in turn is a continuation-in-part of a parent application Ser. No. 651,749, filed Apr. 9, 1957, now abandoned. This application is also a continuation-in-part of my application Ser. No. 501,174, filed Oct. 22, 1965, entitled Continuous Manufacturing Processes and Apparatus, now abandoned, which in turn is a continuation-in-part of a parent application Ser. No. 393,292, filed Aug. 31, 1964, now U.S. Pat. 3,594,254.

SUMMARY OF THE INVENTION

This invention relates to methods for continuously forming and processing composite materials such as composite sheet materials, articles and packaging made of a plurality of members which are continuously laminated or welded together and thereafter treated to improved the physical characteristics of at least one or more components of said composite material.

It is known in the art to irradiate certain polymers to upgrade their physical properties by, for example, cross linking which results in increasing the stiffness or rigidity of the polymer, bumping the melting point and improving the chemical characteristics thereof. Radiation, for example, may be provided by means of a Van De Graff generator or source of atomic fission having the energy thereof directed against the polymer for a predetermined time interval and of such an intensity to effect the desired degree of cross linking of the polymer. However, once the polymer is cross linked, it becomes most difficult to further process same such as by conventional thermoforming, molding or welding techniques. Accordingly, film and sheet materials which have been cross linked may not easily be further processed and generally are limited in the areas of their applications because of the difficulties experienced in further attempting to thermally deform or weld same. Articles which are fabricated as individual units are difficult to process by irradiation means because of the necessity of specially handling and orienting or predeterminately conveying the articles through a radiation field.

Accordingly, it is a primary object of the current invention to provide an improved method for continuously fabricating composite articles and, in the same process, irradiating same to predeterminately improve or change their characteristics.

Another object is to provide methods for making improved laminated materials.

Another object is to provide methods for producing a new and improved filamentary reinforced tape or strapping.

Another object is to provide an improved method for packaging and irradiating consumer products.

Another object is to provide an improved method of forming a container, filling said container with a product to be dispensed therefrom and irradiating the container to improve its physical characteristics and to simultaneously improve or effect predetermined changes in the product held thereby.

Another object is to provide new and improved structures in welded containers made of materials which are substantially enhanced in their physical characteristics after welding of the containers to effect closure thereof.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is a side view showing an apparatus for continuously forming composite materials by laminating and further processing same on an automatic basis.

FIG. 2 is a side view of a modified form of a portion of the apparatus of FIG. 1; and FIG. 3 is a cross sectional view of a material produced by means of the apparatus of FIG. 1.

FIG. 1 illustrates an apparatus for continuously forming and operating on a laminate made of two or more materials such as a base sheet and a reinforcing means therefore. In particular, the apparatus of FIG. 1 may be utilized for fabricating filament reinforced sheet or tape such as tape used in strapping or for winding purposes.

The apparatus 50 includes a first supply means 51 for a reinforcing material 52 which is shown disposed between two other supply means 53 and 55 each of which continuously supply respective sheet materials 54 and 56 which are fed downwardly therefrom towards the downwardly feeding reinforcing material 52. The supply means 51, 53 and 55 may each comprise a respective extruder for continuously extrusion forming their materials or one or more of the devices may comprise means for otherwise providing its material such as a spirally wound coil formation thereof and suitable means for feeding and guiding the material therefrom. Reinforcing material 52 may comprise a single sheet or strip or a plurality of filaments or wires of glass which are fed in parallel array downwardly and of a width such as to cover substantially the width of the sheet members 54 and 56. Endless belt conveyors 57 and 58 respectively guide sheets 54 and 56 into abutment with the reinforcing member 52 and, in certain instances, with each other so as to encapsulate member 52 therebetween.

Power driven rolls 59 and 60 operate to receive and compress the sheet members 54 and 56 against the central element of filaments 52 in a manner to completely encapsulate same between said sheets and to weld the sheets together as they are fed therethrough. The composite formation 61 may comprise a single sheet or ribbon of polymeric material which is internally reinforced with a plurality of filaments, whiskers or wires extending through the central portion thereof in a direction parallel to the longitudinal axis of member 61. The elongated formation 61 is thereafter power driven back and forth around a plurality of rolls 63 to 68 to cause said formation to loop back and forth a number of times in alignment with a device 69 for generating high energy radiation as described and directing same through the looped formation to intersect different portions of member 61 as it travels back and forth between the rollers.

Radiation generating means 69 may comprise a Van De Graff generator, an atomic pile or other suitable source of atomic fission or an electric glow discharge means operating at high frequency and high voltage glow discharge directly in alignment with one or a plurality of the loops of the composite material 61.

Radiation from the high intensity radiation generator or source 69 is of such a characteristic and is operative to irradiate a sufficient area or areas of the composite material 61 during its travel through the field thereof such that a desired and predetermined degree of cross linking of the cross linkable portion of the composite material is obtained. In other words, by providing a source or sources of radiation of predetermined intensity, locating said radiation source or sources so as to irradiate a predetermined effective length of the continuously fed composite material, supplying the components 52, 54 and 56 at such a rate of flow that the composite formation 61 travels through the radiation field at a rate to effect the exposure of any unit area thereof to a predetermined quantity of radiation dosage such that predetermined changes or degree of cross linking occur in the composite material by the time it has been completely irradiated. The end effect may be such as to convert, for example, a thermoplastic polymer such as polyethylene comprising sheet members 54 and 56 from a relatively soft material having a low melting point to a cross linked material of substantially greater rigidity, strength and higher melting point. The reinforcing material 52 which is fed between sheet members 54 and 56 may or may not be also improved in physical and chemical characteristics by the action of the intense radiation. If it comprises glass filaments or fibers fed between sheets 54 and 56 and encapsulated therein by compression of said sheets to completely surround said filaments and become welded together, then the radiation may be such as to improve the bond not only between sheets 54 and 56 but also between the material of said sheets and the filaments 52 so as to provide a substantially improved end product.

Also illustrated in FIG. 1 are means for coating an adhesive on at least one surface of the composite sheet member 61 which comprises a pair of rolls 70 and 71 one of which is power rotated and operative to receive the irradiated sheet 61 and apply suitable pressure-sensitive adhesive to, for example, the upper surface thereof from a supply reservoir 72 of said adhesive. The member 61 may be slitted into separate filaments which are immediately coiled into rolls for dispensing as filament reinforced adhesive tape or may be further processed or coiled before slitting. Notations 73 and 74 refer to cooperating cutting blades which are predeterminately operated to cut predetermined lengths of sheet 61 from the main sheet.

It is noted that the apparatus 50 of FIG. 1 which includes the continuous supply means or extrusion heads 51, 53 and 55 for continuously fabricating an elongated composite member such as a sheet which is internally reinforced with a plurality of filaments or netting, may be provided per se or in combination with a similar array of extrusion heads at the head of a packaging machine to supply one or more reinforcing sheets of material to define the walls of containers or bags which are continuously formed.

It is also noted that the laminating means illustrated in FIG. 1 may be modified whereby a single sheet of thermoplastic polymer such as sheet 54 is continuously formed and fed downwardly as described into abutment with a plurality of reinforcing filaments or netting such as 52 which are also continuously fed downwardly and both formations are thereafter compressed together by the bite of a plurality of rolls or belts which are operative to force the filaments or netting into the surface of the extrusion softened sheet to form an integral assembly and bond between the two prior to the irradiating or container formation thereof.

FIG. 2 illustrates means for irradiating a sheet of material such as the composite material 61 produced as in FIG. 1. A suitable sheet of any material to be predeterminately irradiated to effect, for example, cross linking of one or more components thereof is fed to a core member or drum 76 upon which the sheet is wound for storage thereafter prior to dispensing same. The member 61 may be a strap, tape, ribbon or band with or without an adhesive coating applied thereto as described.

In FIG. 2, irradiation processing of the material 61 is effected as it is wound onto its core or drum 76 by means of a suitable winding means (not shown) which is preferably operative at constant speed. A source 69' of intense radiation such as a Van De Graff generator, quantity of radioactive material, cathode ray tube or other suitable radiation generating means, is disposed to direct radiation of predetermined intensity against and through the outer layer or ply of the winding material thereafter through the subsequent turns of the coil formation 61' during the entire winding operation. In one form of this embodiment of the invention, the radiation emitted by the generator 69' is generated at a constant intensity and the desired degree of cross linking or other radiation effect is attained by subjecting the winding coil formations to a radiation dosage of such an intensity as to provide substantially the entire length of the winding material in the desired physical condition by the time winding is completed or shortly thereafter. The shielding effected by each layer or turn of the winding material 61 for previously wound turns may be such that substantially constant radiation dosage is directed against the entire length of material so wound. However, for those situations where the wound portions of the coil formation 61' which are closer to the core or center thereof are subjected to substantially higher dosages of radiation which may be of such a nature as to degrade same in order to provide sufficient radiation against the outer turns of the coil formation to effect a predetermined change in the characteristics of the material thereof, one or both of two radiation variables may be predeterminately changed during a winding cycle so as to expose the complete length of wound material to substantially the same dosage or to reduce the amount of dosage to which the first wound portions of material are exposed so as not to degrade same. To effect such a process, the intensity of radiation emitted by radiation generating means 69' may be predeterminately varied during a winding cycle. The direction of the beam of radiation may also be predeterminately shifted during a winding cycle or otherwise so directed, perhaps tangentially with respect to one or more turns of the winding coil, to effect the predetermined radiation and controlled dosage of the material being wound. In lieu of shifting the attitude of the source of radiation, the winding coil itself may be predeterminately shifted in location with respect thereto during a winding cycle to provide predetermined changes in the physical characteristics of the entire length of material being wound.

As an example of the radiation dosage required to effect cross linking of a suitable polymeric material applicable to improving material which is fabricated and processed by means of the type hereinbefore described, it is noted that a Van De Graff electron accelerator manufactured by the High Voltage Engineering Company of Burlington, Mass., and capable of generating beam energy having an output of 2,000,000 volts at a power output of 500 watts may be utilized in locations with its output being a foot or less from the surface of the plastic materials described to effect suitable cross linking of such plastics as polyethylene, polypropylene and polyethers. Polyethylene, for example, having a melt index of 1.8 and a molecular weight of about 20,000 may be improved in its adhesion and heat sealing characteristics by exposure with high particle energy generated by a Van De Graff generator of the type defined above for periods of one minute or more and said exposure may be effected by means of a single source of radiation disposed and operative as illustrated in the drawings to simultaneously irradiate different portions of loops of said material wound or guided back and forth through the field of radiation. Exposure to the direct beam of radiation of such a generator or a corona discharge device may also be operative to affect the surface of the sheet material moving through the field in such a manner as to increase its ability to retain and adhere an adhesive such as pressure-sensitive adhesive applied to the sheet material after being so processed. Exposure of polyethylene, for example, to electrical energy in the order of 10,000 to 30,000 watt seconds per square foot for a period of 10 to 30 seconds will substantially increase the adhesion of polyethylene and polyvinyl chloride to each other or to reinforcing material such as glass provided as filaments or fibers for reinforcing purposes as described.

In a modified form of the invention the apparatus of FIGS. 1 and 2 may be modified to cause the feeding of a plastic monomer or combination of monomer and other material or materials between the outer sheets or materials 54, 56 which monomer is thereafter polymerized by the action of the high energy radiation intersecting the composite material as described so as to form a strong bond thereof between the outer materials. Similarly, either or both of the outer sheets or layers of the composite material may be formed by extruding, coating or spraying a plastic monomer or monomers to cover and/or impregnate the core material 52 whereafter said monomer is polymerized in situ on or within the core or central material by the action of the radiation R dosing the composite material.

The polymerized in situ materials so defined above may be further treated by radiation of such an intensity along the path of travel of the composite to effect its cross linking after or during the act of polymerizing same.

If any of the described extruding materials have either or both their surfaces coated with a monomer by passing through vaporous atmospheres containing monomer material, it may be deposited and polymerized in situ thereon by the action of suitable radiation means such as glow discharge means, intense atomic radiation, intense laser light, electron beams or the like.

Also, combinations of the actions of intense pressure applied to the composite by the rolling means and the radiation applied thereto may cooperate to polymerize and/or cross link monomeric material fed and applied as described.

In another form of the invention, it is noted that the radiation generating means 69 of FIG. 1 may be operative to generate a plurality of separate beams of radiation adapted to scan spaced apart band areas of cross linkable material fed therepast as described in such a manner as to effect the crosslinking of only said band areas of material. Single sheet film or composites of materials including such polymers as low or medium density polyethylene or other suitable polymers may thus be radiation treated so that parallel strip portions of the sheet or composite are more rigid and greater in tensile strength than more flexible portions therebetween thus providing a flexible material which is reinforced by cross linked portions forming the same sheet. Suitable masking between the radiation source and the sheet may also be utilized to permit the radiation of only selected areas of the fed sheet material such as spot, net-like or other areas thereof.

In FIG. 3 is shown structural details of a composite sheet material 61 produced, for example, by means of the apparatus of FIG. 1. The sheet 61 is comprised of layers or strata 54' and 56' of the same or different polymers which are integrally bonded or welded together to form a unitary sheet having embedded therein a multiude of filaments 52 or a netting provided and constructed as hereinabove described. In passing through the joining or roll bonding means 59 and 60, the material of sheets 59 and 56 are caused to flow over and around the filaments or netting 52 so as to completely surround same and form a voidless composite structure 61 as illustrated. Either or both rolls 59 and 60 may have operating surfaces which emboss suitable patterns such as irregular roughened indentations, serrations or otherwise shaped regular or irregular patterns 61" operative to improve the adhesion and holding ability of the surface of the tape and the adhesive layer or layers 75 disposed thereon as described. Surface treatment may also be effected by applying a suitable flame, corona electrical discharge, electron beam or other suitable radiation beam discharge or powered brushing elements against the surface of the composite material 61 prior to or after the formation thereof as described.

I claim:

1. A method of fabricating a composite material, comprising:
   (a) feeding from a first supply means an elongated base of solid synthetic polymeric material which, upon being subjected to high energy irradiation, will undergo a substantial change in molecular structure manifested as a substantial increase in strength and resistance to heat;
   (b) feeding from a second supply means solid glass fibers as reinforcing material for said polymeric material;
   (c) generating and directing high energy radiation, which is operative to produce said substantial change, against said base and said reinforcing material while holding them in contact with one another; and (d) continuing the irradiation of the base and reinforcing material in contact with one another for a sufficient time and at a sufficient intensity for increasing the strength and resistance to heat of the base material.

2. A method in accordance with claim 1 wherein said base is formed continuously by extrusion.

3. A method in accordance with claim 1 wherein said base is of polyethylene.

4. A method in accordance with claim 1 wherein only selected areas of said base are irradiated for providing in the resultant product rigid and flexible portions with the flexible portions supported and strengthened by the rigid portions.

5. A method in accordance with claim 1 wherein said glass fibers are pressed against said base member for bringing them into contact therewith.

6. A method in accordance with claim 5 wherein a plurality of glass fibers in the form of continuous filaments are compressed between first and second portions of said base member.

7. A method in accordance with claim 4 wherein said filaments are fed as a closely spaced parallel array between said first and second portions to form a thin sheet with said filaments encapsulated therein.

8. A method in accordance with claim 1 wherein said glass fibers are in the form of continuous filaments.

9. A method of fabricating a composite material, comprising:
  (a) providing an elongated member of solid synthetic material which, upon being subjected to high energy irradiation, will undergo a substantial change in molecular structure manifested as a substantial increase in strength and resistance to heat;
  (b) said elongated member having therein solid glass fibers as reinforcing material for said polymeric material;
  (c) generating and directing high energy radiation which is effective to produce said substantial change against said elongated member and the reinforcing material therein; and
  (d) continuing the irradiation of the elongated member and reinforcing material for a sufficient time and at a sufficient intensity for increasing the strength and resistance to heat of the elongated member.

10. A method of fabricating a composite material, comprising:
  (a) extruding an elongated member of solid synthetic polymeric material which, upon being subjected to high energy irradiation, will undergo a substantial change in molecular structure manifested as a substantial increase in strength and resistance to heat;
  (b) said elongated member having therein solid glass fibers as reinforcing material for said polymeric material;
  (c) generating and directing high energy radiation, which is effective to produce said substantial change, against said elongated member and the reinforcing material therein; and
  (d) continuing the irradiation of the elongated member and reinforcing material for a sufficient time and at a sufficient intensity for increasing the strength and resistance to heat of the elongated member.

11. A method of fabricating a composite material, comprising:
  (a) extruding an elongated member of solid synthetic polymeric material which, upon being subjected to high energy irradiation, will undergo a substantial change in molecular structure manifested as a substantial increase in strength and resistance to heat;
  (b) said elongated member having therein solid glass fibers as reinforcing material for said polymeric material, said polymeric material completely surrounding said glass fibers;
  (c) generating and directing high energy radiation, which is effective to produce said substantial change, against said elongated member and the reinforcing material therein; and
  (d) continuing the irradiation of the elongated member and reinforcing material for a sufficient time and at a sufficient intensity for increasing the strength and resistance to heat of the elongated member and for improving the bond between said polymeric material and said glass fibers.

12. A method in accordance with claim 11 wherein said polymeric material is polyethylene.

References Cited
UNITED STATES PATENTS

| Number | Date | Name | Class |
|---|---|---|---|
| 2,744,041 | 5/1956 | Balchen | 161—143 X |
| 2,955,953 | 10/1960 | Graham | 204—159.14 X |
| 3,058,863 | 10/1962 | Gaines et al. | 156—244 X |
| 3,111,424 | 11/1963 | Le Clair | 204—159.17 X |
| 3,272,684 | 9/1966 | Moore | 156—272 X |
| 3,330,748 | 7/1967 | Lawton | 204—159.14 X |
| 2,887,721 | 5/1959 | Blanchi et al. | |
| 2,919,473 | 1/1960 | Cole | 161—412 X |
| 2,929,744 | 3/1960 | Mathes et al. | |
| 2,957,814 | 10/1960 | Busse et al. | 204—159.17 |
| 2,999,056 | 9/1961 | Tanner | 117—93.31 X |
| 3,146,146 | 8/1964 | Anderson | 117—93.31 X |
| 3,501,330 | 3/1970 | Cassiers et al. | 117—62 X |

HAROLD ANSHER, Primary Examiner

U.S. Cl. X.R.

117—93.31, 126; 156—272; 161—412; 204—159.2